J. Wagner.
Dinner-Kettle.
Nº 76121. Patented Mar. 31, 1868.
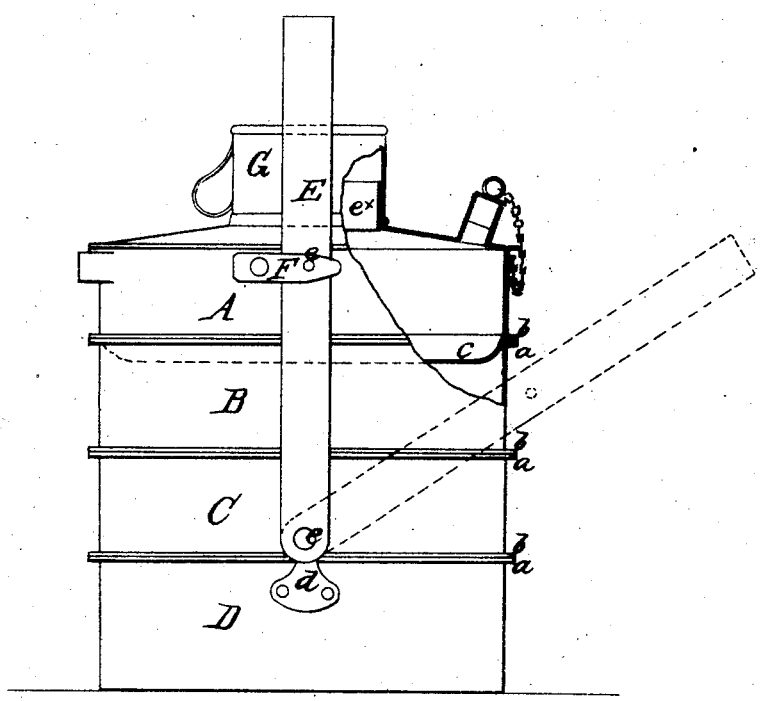
Witnesses.
W. C. Ashkettle
J. Fraser
Inventor.
J. Wagner
per Munn & Co
Attorneys.

United States Patent Office.

JOHN WAGNER, OF CUMBERLAND, MARYLAND.

*Letters Patent No. 76,121, dated March 31, 1868.*

IMPROVEMENT IN DINNER-KETTLES.

*The Schedule referred to in these Letters Patent and making part of the same.*

TO ALL WHOM IT MAY CONCERN:

Be it known that I, JOHN WAGNER, of Cumberland, in the county of Alleghany, and State of Maryland, have invented a new and improved Dinner-Kettle; and I do hereby declare that the following is a full, clear, and exact description thereof, which will enable those skilled in the art to make and use the same, reference being had to the accompanying drawings, forming part of this specification.

This invention relates to a new and improved dinner-kettle, and it consists in a peculiar construction of the same, as hereinafter fully shown and described, whereby a greater number of compartments are obtained than usual, and the different kinds of food kept separate from each other.

The accompanying drawing represents an elevation of my invention, partly in section. A B C D represent four cups of cylindrical form, of any suitable dimensions, and each provided or formed with a flange, $a$ $b$, at its top and bottom. These flanges project out horizontally from the cups, the upper flanges $a$ extending outward from the tops of their sides, and the lower ones, $b$, extending outward a short distance above the bottoms $c$ of the cups, the sides of the cups below the flanges $b$ inclining inward, so that the bottom and lower part of one cup may fit in the top of the one underneath, the lower flange, $b$, of the upper cup resting on the top flange, $a$, of the one underneath, as shown clearly in the drawing.

The bottom cup D, as it does not fit in any cup underneath, may have a cylindrical form its entire height. To the lower cup D, a bail or handle, E, is attached by rivets $c$, which pass through the upper ends of lugs or ears $d$, secured to the lower cup D at opposite sides thereof. This bail extends over the top cup A, and has a pin, $e$, projecting from each side of it to fit into perforated elastic plates F F, attached to opposite sides of the top cup A. By this arrangement the several cups are all retained in position, secured together, so that they cannot become casually detached.

The top cup A is supplied with a nozzle and stopper, and is designed for holding a liquid—coffee, tea, milk, or other drink—and on the central part of the top of A there is secured a chamber, $e^\times$, to hold salt, pepper, &c., said chamber being covered by a drinking-cup, G.

It will be seen that by this improvement, several different kinds of food may be kept separate from each other, each being contained in a separate cup or compartment; and it will further be seen that, by pressing outward the plates F so as to release the pins $e$ from them, the top cup may be removed, and the others below it, without any trouble or difficulty whatever.

I claim as new, and desire to secure by Letters Patent—

A dinner-kettle, composed of a series of cups or vessels, fitted one within the other, and connected together by the bail and suitable catches, in the manner substantially as herein shown and described.

JOHN WAGNER.

Witnesses:
JOHN R. CRUZEN,
RAN. R. ENOCHS.